United States Patent [19]

Schlitt

[11] 4,162,432

[45] Jul. 24, 1979

[54] REPETITIVELY PUMPED ELECTRON BEAM DEVICE

[75] Inventor: Leland G. Schlitt, Livermore, Calif.

[73] Assignee: The United States of America as represented by the United States Department of Energy, Washington, D.C.

[21] Appl. No.: 868,638

[22] Filed: Jan. 11, 1978

[51] Int. Cl.² ............................................. H01S 3/09
[52] U.S. Cl. ................................... 315/349; 315/339; 328/227; 328/233; 331/94.5 PE
[58] Field of Search ............... 331/94.5 PE; 328/227, 328/233; 315/246, 268, 339, 349

[56] References Cited

U.S. PATENT DOCUMENTS

| | | | |
|---|---|---|---|
| 3,828,274 | 8/1974 | Krawetz | 331/94.5 PE |
| 3,925,670 | 12/1975 | Farrell et al. | 250/400 |
| 3,956,711 | 5/1976 | Waynant | 331/94.5 PE |
| 3,972,009 | 7/1976 | Duchet | 331/94.5 PE |
| 4,041,415 | 8/1977 | Ault et al. | 331/94.5 PE |
| 4,047,125 | 9/1977 | Dreyfus | 331/94.5 PE |

OTHER PUBLICATIONS

Loda et al., Repetitively Pulsed Electron Beam Generator, Electron Beam Technology Symposium, Sandia Corp. (Albuquerque, N.M., Nov. 1-3, 1975).
Akimov, et al. Generation of Controllable Light Pulses in an Electron-Beam-Pumped Laser, Soviet Journal of Quantum Electronics, vol. 1, 1972, pp. 649-651.
Yamamoto, et al. Nanosecond Pulsed Electron Source with Double Pulse Control, Review of Scientific Instruments, vol. 45, 1974, pp. 591-592.
Bagaev, et al. Electron-Beam-Controlled Carbon Dioxide Laser Operating under Pulse Repetition Conditions, Soviet Journal of Quantum Electronics, vol. 4, 1974, pp. 777-779.
Ault, Table-Top Ar-$N_2$ Laser, Applied Physics Letters, vol. 26, 1975, pp. 619-620.

*Primary Examiner*—Eugene R. LaRoche
*Attorney, Agent, or Firm*—Dean E. Carlson; R. S. Gaither; P. Martin Simpson, Jr.

[57] ABSTRACT

Apparatus for producing fast, repetitive pulses of controllable length of an electron beam by phased energy storage in a transmission line of length matched to the number of pulses and specific pulse lengths desired.

11 Claims, 12 Drawing Figures

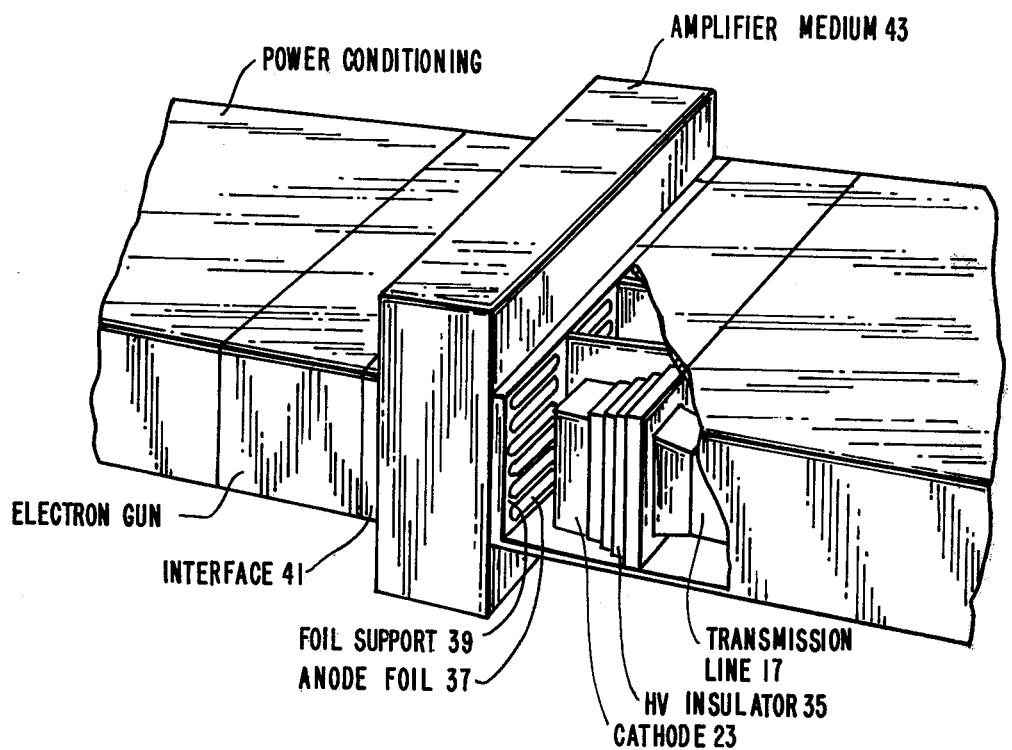
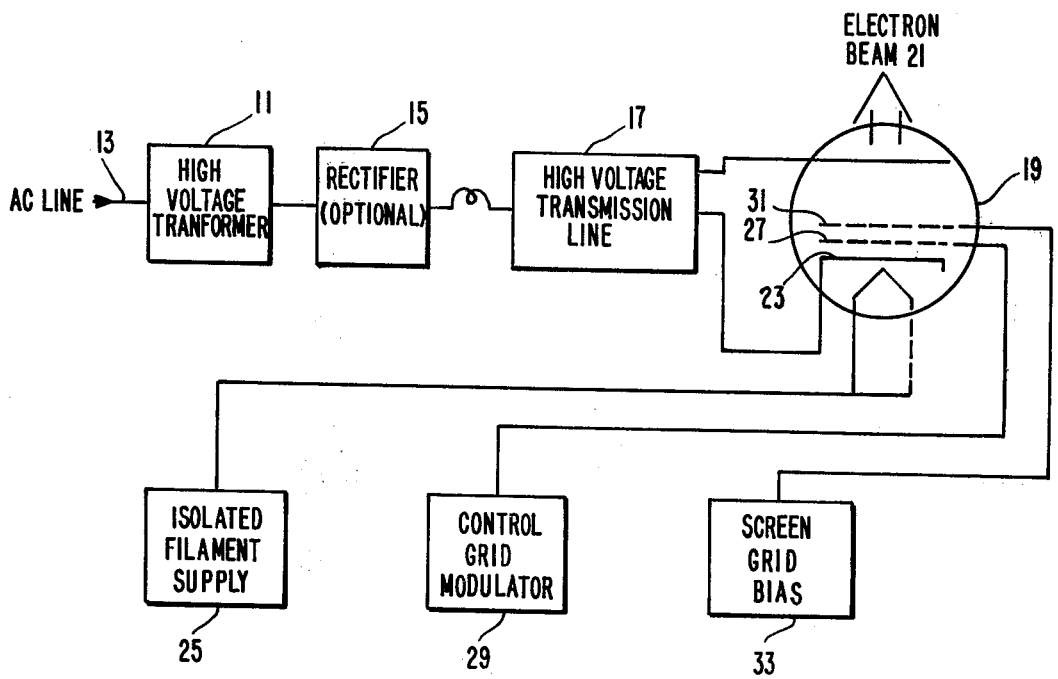

PULSE LENGTH = $\tau$
PULSE SPACING = $5\tau$
LINE LENGTH = $4\tau$

REPETITIVELY PUMPED ELECTRON BEAM DEVICE

The invention described herein arose at the University of California Lawrence Livermore Laboratory in the course of or under Contract W-7405-ENG-48 with the U.S. Department of Energy.

FIELD OF INVENTION

This invention pertains to production of repetitive pulses of an electron beam.

BACKGROUND OF THE INVENTION

The possibility of using electron beams to pump a laser, either directly or secondarily through a photolytic process, is an attractive spectre, offering far higher efficiencies (typically, 4–10%) than conventional flashlamp pumping. If one would use an electron beam to repetitively pump a laser oscillator or amplifier, directly or indirectly, the electron beam device must supply a multiplicity of short electron beam pulses (each pulse being nanoseconds to microseconds in length) at moderate interpulse microseconds or longer).

Akimov, et al, 1 Journal of Quantum Electronics 649 (English translation) (1972) indicates the use of an electron beam with repetition rate of 250 Hz, to drive a semiconductor laser, but no details are given.

Yamamoto, et al, 45 Journal of Scientific Instruments 591 (1974) teach the use of additive combinations of positive and negative voltage pulses propagating in a transmission line to achieve short e-beam pulses ($\Delta \tau \sim$ nano-seconds) with repetition rates of 1–1000 Hz. The currents are small here, being less than 1 amp.

Babaev, et al, 4 Soviet Journal of Quantum Electronics 777 (English translation) (1974) describe an electron gun which produces large currents ($\sim 500$ amps) at repetition rates of 5 Hz with pulse length 1 $\mu$sec. apparently using conventional approaches to e-beam formation.

Ault, 26 Applied Physics Letters 619 (1975) discloses a high current density ($J \gtrsim 100$ amps/cm$^2$), low impedance transmission line electron pulser allowing repetition rates of 1 Hz. The device uses a sequence of six cathode blades, radially directed on a cylindrical or coaxial geometry.

Loda and Meskan, "Repetitively Pulsed Electron Beam Generator", Electron Beam Technology Symposium, Sandia Corporation (Albuquerque, New Mexico, Nov. 1–3, 1975) discuss a long pulse length ($\Delta t \sim 3$ $\mu$sec) electron beam generator with current density $J \sim 1$ amp/cm$^2$, having a repetition rate of 50 Hz and a large useful aperture (area $\sim 1$ (meter)$^2$). Cold emission from a tantalum foil cathode is used to generate a timed series of emissions at different points along the foil, although it is unclear how controllable is the time sequence of emissions.

Weinfeld and Bouchoule, 47 Review of Scientific Instruments 412 (1976) disclose a short pulse ($\Delta t \lesssim 1$ nsec), low energy (1–100 eV) electron gun having a repetition rate of perhaps 100 MHz, using a step recovery diode which manifests alternate low and high impedance states, depending upon the rapidly changing bias applied at the diode. The energy and current density of an assembly of such diodes are apparently limited to low values.

U.S. Pat. No. 3,925,670 to Farrell, et al teaches the use of a rapidly pulsed cold cathode system to obtain repetition rates of 1–10 kHz with slow rise time ($\gtrsim 0.1$ $\mu$sec) and relatively long pulse lengths (0.1–10 $\mu$sec). The electrons thus produced tend to spray over a large area, which may make attainment of beam uniformity a problem.

U.S. Pat. No. 3,956,711 to Waynant discloses a travelling wave transverse electron beam using timed electron emission from a sequence of thin blades driven seriatim by a high voltage transmission line. The time sequence for firing is controlled by cutting different lengths for each of the cables connecting blades and line so that in principle arbitrary pulse repetition rates are possible. However, the cathode spatial emission is non-uniform by definition; and the emission current density associated with any one blade is small as it represents a fraction of the current initiated by a single pulse from a capacitor bank.

Only in Weinfeld, et al has a $10^4$ Hz repetition rate been exceeded and that was for short pulses of pulse length less than 1 nsec and low energy (1–100 ev). The electron gun to produce a higher repetition rate at higher energies is lacking in the art shown above. Such a requirement is necessary for repetitively pulsed regenerative amplifiers in order to excite the lasing medium before each laser pulse passage.

SUMMARY OF INVENTION

The invention is directed to a repetitively pulsed electron beam machine which is capable of producing electron beam pulses at current densities up to 1.5 amps/cm$^2$, with pulse lengths in the range of 25 to 500 nano-seconds, with repetition rates of the order of $10^4$–$10^6$ Hz, in bursts of a predetermined number of consecutive pulses, as for example 2–50 pulses, of more or less arbitrary pulse spacing (for example, 1–10 microseconds apart) these features are not available in the prior art, which produce at best either pulse repetition rates of 1–10 kHz at low current densities or produced higher current densities ($J \lesssim 100$ amps/cm$^2$) at very low pulse repetition rates (1 Hz). The apparatus of this invention includes a source of electrons; a cathode connected to the source; an anode for accelerating the electrons from the cathode; a predetermined length transmission line, to which the cathode is connected, for storage of voltage pulses induced at the cathode; insulator means to maintain a potential difference between transmission line and anode; and a means for producing a sequence of voltage pulses at the anode.

One object of the invention is to provide an electron beam machine capable of delivering a sequence of electron pulses with pulse repetition rates $\gtrsim 10^4$ Hz.

Another object of the invention is to provide an electron beam machine capable of delivering electron pulses with pulse repetition rates $\gtrsim 10^4$ Hz and current densities of up to approximately 10 amps/cm$^2$.

Another object of the invention is to provide an electron beam machine capable of delivering electron pulses with pulse repetition rates $\gtrsim 10^4$ Hz and pulse lengths of 20–500 nsec.

Another object of the invention is to provide an electron beam machine capable of delivering electron pulses with pulse repetition rates $\gtrsim 10^4$ Hz and pulse intervals of approximately one microsecond or greater.

Another object of the invention is to provide an electron beam machine capable of delivering electron pulses with pulse repetition rates $\gtrsim 10^4$ Hz for two to 100 pulses.

Another object of the present invention is to provide an electron beam machine capable of repetitively pumping a regenerative laser amplifier before each pass of the laser pulse.

Another object of the invention is to use phased energy storage on a transmission line to provide novel pulse sequencing.

Other objects and advantages of the invention will become clear from the detailed description and the accompanying drawings.

BRIEF DESCRIPTION OF THE DRAWINGS

FIG. 1 is a cutaway perspective view of a preferred embodiment, showing a two-sided beam machine interfacing with a laser medium.

FIG. 2 is a schematic view showing the transmission line, cathode and associated control grids.

DETAILED DESCRIPTION OF INVENTION

A repetitively pulsed electron beam machine with a repetition frequency greater than $10^4$ Hz and a relatively high current density requires a departure from past approaches. Phased energy storage provides this needed method of pulse production.

Figure 6:
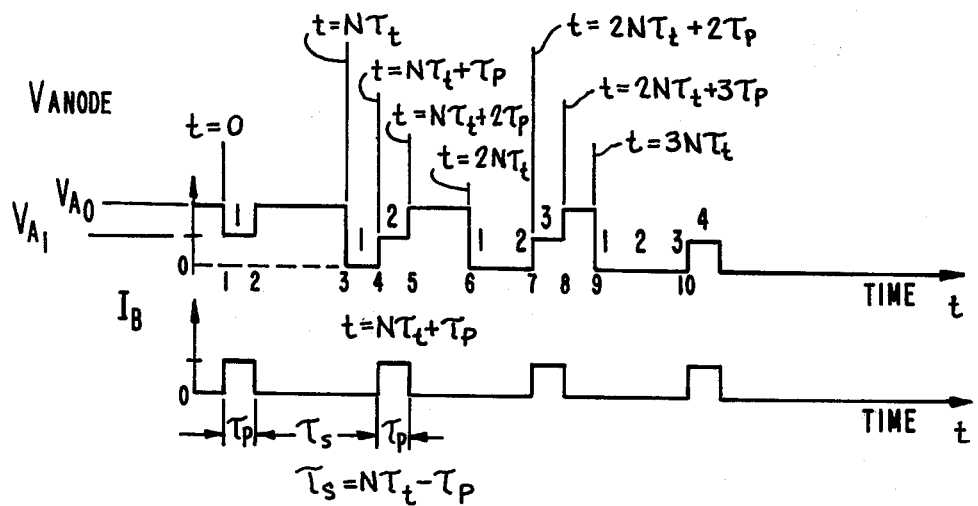
FIG. 6 is a graphic view of anode voltage and beam current as a function of time, using the phased energy storage approach, for one burst of beam pulses.
Figure 7:
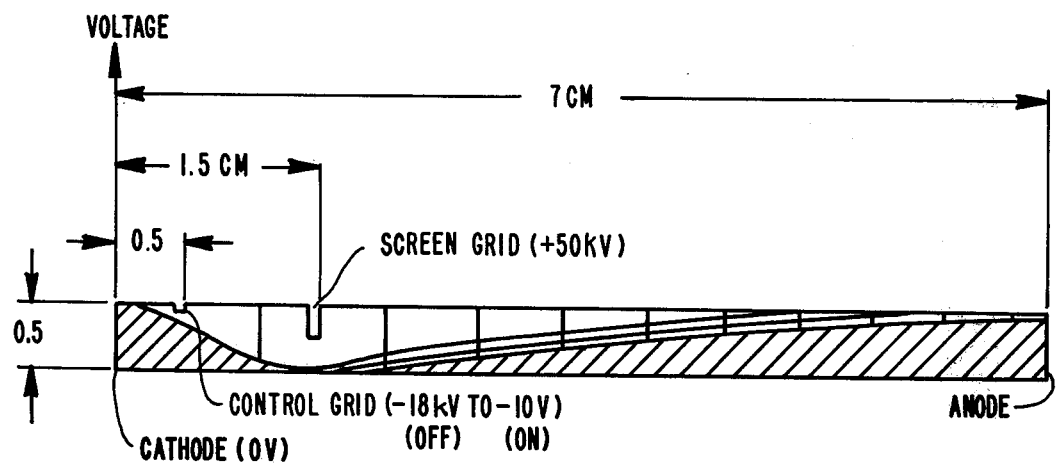
FIG. 7 is a graphic view of voltage developed in the space between cathode and anode.

The phased energy storage approach is indicated schematically in FIG. 6 whereon the notation and symbols described below are defined and shown. The line is initially charged uniformly to a voltage $V=V_o$ prior to pulsing, and pulsing occurs as usual by turning the gun on and off at appropriate times so as to selectively deplete the line energy. An initial voltage pulse is applied to a control grid 27 (FIG. 2) to induce a voltage pulse $V=V_{A1}=\frac{1}{2}V_o$ of length $\tau_p$ shown ideally as a square pulse, at the anode at time $t=o$; electron current flows from cathode to anode in response thereto; this results in a localized change in the anode-cathode voltage of amount $\Delta V=-V_{A1}$ and in an electron beam current pulse $I=I_B$ over the same time interval. The electron gun is turned off at $t=\tau_p$, and the anode-cathode potential returns to its original value $V=V_o$. The originally-uniform line potential now has a square notch of magnitude $\Delta V=V_{A1}$ and length $\tau_p$, which travels to the far end of the transmission line, is reflected, and returns to the cathode (located precisely at the near end of the line), with the expiration of a time interval $\Delta t=\tau_t=2L/v$ ($>\tau_p$), where L=length of the line and v=velocity of propagation of voltage notch in the line. In FIG. 6 minimal distortions are introduced by propagation of and relection of the voltage notch within the line.

During the time interval $\tau_p<t<N\tau_t$, where N is a suitably chosen fixed positive integer, the first voltage notch is reflected back and in the line N times. In the time interval $N\tau_t<t<\tau_p+N\tau_t$, the line voltage, as sensed at the cathode, satisfies V=0 as a result of reflection characteristics at the end of the line; this is shown in FIG. 6. During the interval $\tau_p+N\tau_t<t<2\tau_p+N\tau_t$, the anode-cathode voltage is again depressed ($\Delta V=-V_{A1}$) by a voltage pulse of length $\tau_p$, applied at the control grid, the electron gun turns on, and the anode-cathode voltage again drops from $V=V_o$ to $V=\frac{1}{2}V_o$ in response thereto over this same time interval. A second pulse of electrons, represented by $I_B(t)$, flow from cathode to anode, and a second square notch follows the first notch down the transmission line and is reflected back and forth N times. Again, because of reflection peculiarities, the line voltage sensed at the cathode satisfies V=0 for $2N\tau_t<t<2\tau_p+2N\tau_t$, as shown. The procedure is repeated many times: (1) in the interval $mN\tau_t<t<m(\tau_p+N\tau_t)$ (m=1,2,3, . . . ), the anode-cathode is zero due to reflection peculiarities; (2) in the interval $m(\tau_p+N\tau_t)<t<(m+1)\tau_p+mN\tau_t$, the anode-cathode voltage is again pulsed (through the control grid) by an amount $\Delta V=-\frac{1}{2}V_o$, the anode-cathode voltage is reduced to $V=\frac{1}{2}V_o$ in response thereto, and a pulse $I_B(t)$ of beam current moves from cathode to anode; (3) in the interval $(m+1)\tau_p+mN\tau_t<t<(m+1)(\tau_p+N\tau_t)$, the line voltage notch is reflected back and forth along the line N times.

The above-described process is limited in time due to the possibility of pulse overlap. More particularly, one requires that $(m+1)\tau_p<\tau_t$. In FIG. 6, for illustrative purposes, the choices N=1, line length $2L=4v\tau_p$ and current pulse spacing $\tau_s=\tau_t-\tau_p=4\tau_p$ have been made. This would limit the devices to an output of four current pulses, each of duration $\tau_p$, spaced a distance $5\tau_p$ apart.

Figure 12:
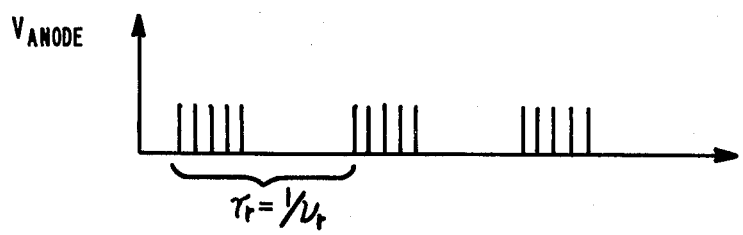
FIG. 12 is a graphic view of anode voltage as a function of time, showing burst repetition frequency $\nu_r$ and the relationship of pulses within a burst.

More generally, the burst frequency will be $$\nu_b=1/N\tau_t$$

as shown in FIG. 6. The burst of current pulses $I_B(t)$ shown in FIG. 6 is repeated by recharging the transmission line to a uniform line to a uniform potential and repeating the above described procedure. If the time between bursts is $\Delta t=\tau_r$ the repetition rate from one sequence to bursts to the next will be $$\nu_r=1/\tau_r$$

as shown in FIG. 12.

In compensating for capacitance effects and such in the abrupt change in line potential sensed at the cathode, it may be advisable to allow the line voltage a small interval of time $\Delta t=t_{ret}(<\tau_p)$ to return to $V=V_o$ at $t=m(\tau_p+N\tau_t)$ (m=1,2,3, . . . ) before pulsing the anode again to produce another pulse of electrons.

This embodiment to electron beam pulsing requires that the cathode impedance be matched (within ±5%) to the impedance of the transmission line to avoid spurious reflections of the propagating voltage pulses. If the pulse length is $\tau_p=30$ nanoseconds (nsec) and the pulse-to-pulse spacing within the burst is $\tau_s=1.32$ μsec., and finally if the transmission line length is such that round trip transit time is $\tau_t=330$ nsec, a maximum burst of 11 $(=\tau_t/\tau_p)$ such consecutive beam pulses is available; and each voltage notch makes 4 $(=\tau_s/\tau_t)$ round trips along the line between beam pulses.

One may, if one chooses, vary the pulse-to-pulse spacing $\tau_s=N\tau_t$ within limits by varying the choice of the positive integer N. One may also vary the pulse length $\tau_p$ (at the anode) from one pulse to the next. This last variation can be useful in varying the excitation of a laser gain medium, pumped by the electron beam, as a function of time.

Figure 10:
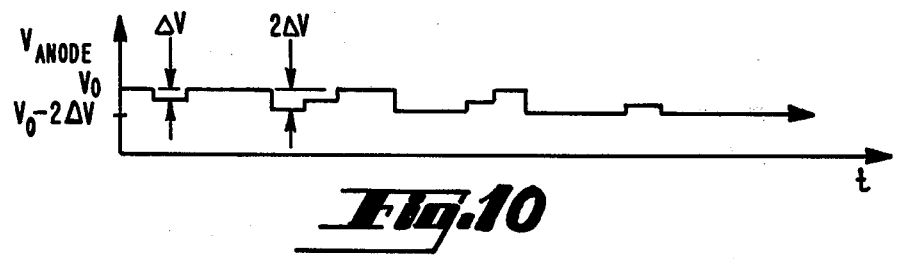
FIG. 10 is a graphic view of anode voltage as a function of time in an alternative embodiment.
Figure 11:
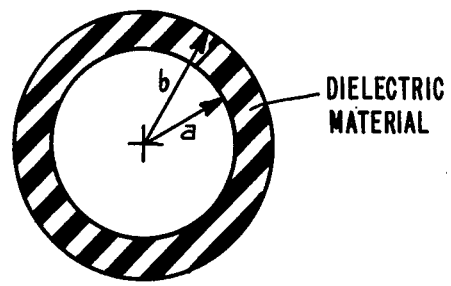
FIG. 11 is an end view of a coaxial transmission line in the alternative embodiment.

Another approach, exhibited schematically in FIG. 10, utilizes a transmission line with very small line impedance Z relative to the electron gun impedance R(Z/R<<1). With the control gird, and hence the anode, turned on, the line voltage now drops from $V=V_o$ to $V=V_o-\Delta V$ with $\Delta V/V_o<<1$, and the reflection of the line pulse at the near end (corresponding, e.g., to the interval $N\tau_t \leq t \leq N\tau_t+\tau_p$ in FIG. 6) results in a voltage $V=V_o-2\Delta V$. The minimization of line impedance Z is achieved by making the inner radius a and outer radius b of the coaxial line (FIG. 11) nearly equal. This allows use of a higher average field strength E across the dielectric since the field is now more nearly uniform, and the field strength is limited by damage occurring at the point of highest field. The use of lower impedance is also advantageous in that (1) it results in lower requirements on charge voltage and thus permits smaller grid-anode spacings and (2) it allows more efficient use of the line dielectric (preferably oil) for energy storage.

FIG. 1 exhibits a preferred embodiment of the subject invention, which is method and apparatus for producing a sequence ($\sim$2–20) of spaced, short duration (25 nsec or longer) pulses of an electron beam with a high pulse repetition rate (up to $10^6$ sec$^{-1}$). The short pulses, generally 25-100 nanoseconds, require ultra-low inductance electron guns and power conditioning; while the interpulse spacing, generally 1-10 microseconds, is both short enough to pose severe recovery problems in conventional plasma switching and long enough to preclude the use of plasma cathode devices. The subject invention achieves the desired pulse sequencing by a novel approach, using phased energy storage on a transmission line with impedances matched to the electron gun.

Referring to FIG. 2, the power conditioning system comprises a high voltage transformer 11 fed by an AC line 13, with line output fed in turn to rectifier 15 to produce a high voltage DC signal. This signal is stored in a transmission line 17 of predetermined length which is electrically 5 connected to an electron gun 19 to drive the electron beam 21. The electron beam 19, whose impedance is matched to the transmission line 17, includes a cathode 23 and filament, connected to a filament supply 25; a control grid 27, connected to a control grid modulator 29; and a bias screen 31, connected to a source 33 of grid bias.

The electron gun and transmission line together form a module, shown in one embodiment of FIG. 1. A high voltage transmission line 17, of finite length, is operatively associated through a high voltage insulator 35 to the electron gun 19. Free electrons appearing at the cathode 23 are accelerated by control voltages appearing at one or two lower voltage grids 15, 27 and 31 (FIG. 2) and by the anode voltage appearing at the anode 37, a metal foil perhaps 10 microns thick which is mechanically supported by a foil support 39. The foil and foil support comprise an interface 41 between the transmission line-electron gun module and the excitable medium 43. The electrons, which may be accelerated to relativistic energies with velocities greater than one tenth the speed of light ($c=3\times10^{10}$ cm/sec), pass through the foil and foil support and into the excitable medium 43 where they deposit most of their energy. The electron beam may enter from one side of the medium 43, or it may enter from symmetrically disposed electron beam devices on two or more opposite sides of the medium as shown in FIG. 1. One advantage of a symmetric arrangement is that the energy deposition in the medium 43 is also symmetric and generally more uniform.

Figure 3:
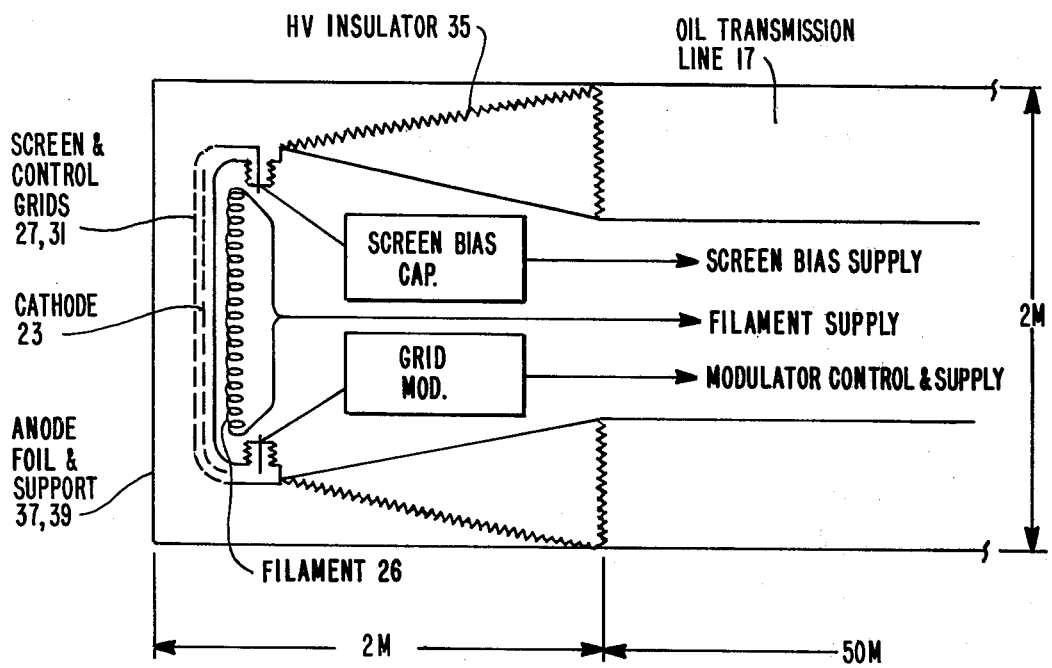
FIG. 3 is a schematic view of the beam machine showing the placement of a thermionic drive filament as a source of electrons.

The electron gun 19 itself is a thermionic device, shown in some detail in FIG. 3. The high voltage transmission line 17, which may have oil as a storage medium, is directly connected through the insulator 35 the anode or foil 37. The cathode 23 is disposed between the anode and the filament 26. The filament or heater acts to maintain a high temperature on the cathode surface so as to supply an abundance of thermionically-freed electrons, according to the well known Richardson-Dushman equation $J$ = thermionic current density
$(\text{amp/cm}^2) = A_1 T^2 \exp[-(\Phi-e\Delta V)/k_B T]$ $A_1 \lesssim 120$ amps/cm/(K)
$\Phi$ = work function of the material $\approx$ 1–6 ev.
$\Delta V$ = anode-cathode voltage difference acting upon electrons at thermionic emitter surface.

The work function $\Phi$ and multiplier $A_1$ are characteristic of the cathode material. The cathode is normally operated at a high temperature such as T=1,200°–2,000° K., which may require that the cathode be constructed of a refractory material such as nickel ($\Phi\gtrsim4.8$ ev), molybdenum ($\Phi\gtrsim4.8$ ev), tungsten ($\Phi\gtrsim4.5$ ev or rhenium ($\Phi\gtrsim5.1$ ev) with large work functions and correspondingly small currents ($J\lesssim0.01$ amps/cm$^2$ at T=2,000° K.). From the work of Langmuir and Taylor, 44 Phys. Rev. 423 (1933), and the work discussed by L. N. Dobretsov and M. V. Gomoyunova, *Emission Electronics*, Israel Program for Scientific Translations, 1971, pp. 147–153, one finds that one may use a cesium or barium or strontium or similar film on an oxide of the refractory material to dramatically lower the work function. For example, Mo-O-Cs has a work function of 1.4 ev, with correspondingly increased thermionic current. This approach allows single shot thermionic current densities of as much as J=10–100 amps/cm$^2$, although smaller densities (J$\approx$1.5 amps/cm$^2$) suffice for the subject invention; this allows operation at smaller temperatures such as T$\approx$1150° K.

Figure 4:
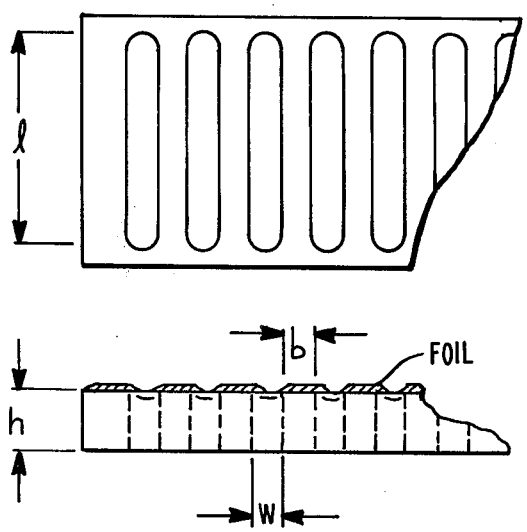
FIG. 4 is top and side views of a preferred embodiment of the foil support for the anode.

The foil support 39, shown in FIG. 4 is a series of rectangular beams of length l$\approx$100 cm., width b$\approx$0.5 cm, and thickness h$\approx$4 cm, with openings therebetween of width w$\approx$2 cm. This structure has a geometric transmission of about 80% for l=100 cm. The foil will require cooling if used either with a thermionic gun or at high pulse repetition rates. Radiation from an oxide cathode at T=1150° K. is 9 watts/cm$^2$, and a foil support with high emissivity will intercept 84% of this energy. If the emissivity of the anode or foil material is ≲0.5, the radiation heat load on the foil would be about 0.7 watts/cm². Assuming the electrons have energies of 1.5 Mev as they arrive at the foil, calculations indicate that about 1.5% of the incident energy is deposited in a 13 μm thick nickel foil, as considered here. Assuming an 80% transparent foil support, a single pulse of 1.5 Mev electrons at 1.5 amps/cm² will result in a beam heat load of 0.9 watts/cm² on the foil, using a burst repetition frequency of $\nu_r = 100$ Hz. This would thus result in a total heat load on the foil of 1.6 watts/cm², which can probably be adequately controlled by forced convection cooling of the foil (and foil support).

Figure 5:
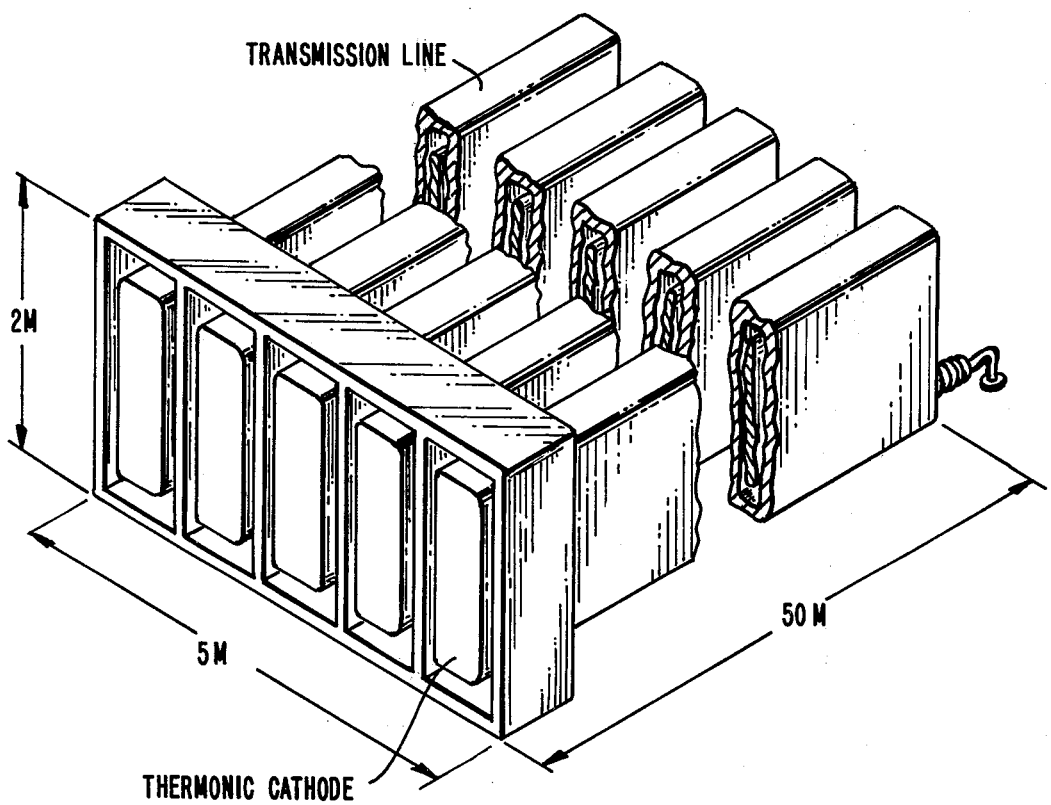
FIG. 5 is a cutaway perspective view of a modularized electron gun assembly.

The electron beam device may be one such module, as shown in FIG. 1, or it may be comprised of several adjacent modules to cover a larger area, as suggested in FIG. 5.

One application to which the repetitively pulsed electron beam can be applied is a regenerative laser that is pumped at $10^4$–$10^6$ Hz. The following is one set of design parameters:

TABLE I

| | |
|---|---|
| laser energy | = 300 kilojoules |
| laser pulse length ($\tau_p$) | = 25 nanoseconds |
| pulse spacing (rep. rate) | = 13.3 microseconds |
| gain medium | = .94 Ne + .05 Xe +0 .01 F₂ (gas) |
| pressure (laser medium) | = 0.5–5.0 atm |
| laser medium density | = 4.9 × 10⁻³ gm/cm³ (p = 4.3 atm) |
| number of pulses in burst | = 20 |
| electron energy | = 1.5 MeV |
| geometry | = two-sided planar |
| amplifier size | = 2 × 2 × 5 meters |
| electron beam area | = uniform |
| electron beam profile | = uniform |
| current density | = 1.5 amps/cm² |
| foil material | = Ni |
| foil thickness | = 13 μm |
| transmission line length | = 43 m |

Figure 8:
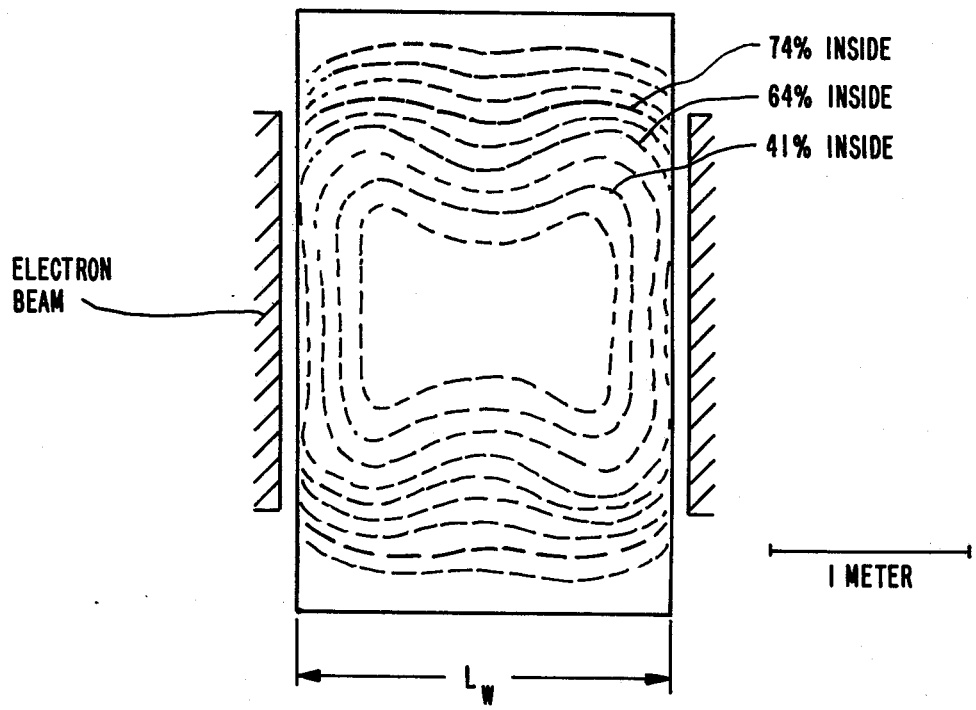
FIG. 8 shows representative energy deposition contours obtained in 4.3 atmosphere mixture of Ne, Xe and $F_2$ gases using the subject invention with 1.5 MeV initial electron energy.

Planar geometry (see FIG. 1) is chosen to permit gas flow through the amplifier, and two-sided injection is used to improve the uniformity of the deposited energy. E-beam ionized, gas-flow laser amplifiers are old and well known in the art, such as the E-beam sustained CO₂ laser designs at LASL and AERL. FIG. 8 indicates a sequence of energy deposition contours, representing average fractional electron kinetic energy deposited inside each contour. One notes that the contours are approximately rectangular in cross-section. As the beam height h is increased, these contours may more nearly approach rectangles in cross-section. Electron energy losses in the foil 37 require initial electron kinetic energies ≳0.25 MeV. For a case where a deposition uniformity of ±10% is required for the configuration of FIG. 8, then the optical extraction will be primarily limited to the central region inside the 80% contour containing 41% of the deposited energy. Where a ±20% deposition uniformity is needed, the extraction zone will be primarily the region inside the 60% contour containing 64% of the deposited energy. Thus, increasing both beam and laser height will increase efficiency and improve the uniformity of energy deposition. For the above cited configuration of FIG. 8, 92% of the incident electron energy is deposited in the gain medium.

Some of the above figures result from a computer analysis used to confirm prior work. The public may obtain copies from the Technical Information Center at Oak Ridge, Tennessee; the codes are as follows: electron transport code SANDYL (H. M. Colbert, "SAN-DYL", Sandia Labs., Livermore, Calif., Rept. SCL-DR-720109, alternate number SLL-74-00123, 1973) and the electron trajectory code EGUN (W. B. Herrmannsfeldt, "Electron Trajectory Program", Standford Linear Accelerator Center, Stanford, Calif. SLAC-166, UC-28, September 1973). Also, the required length d of the transmission line is calculated from the equation $$d = (C/\sqrt{\epsilon})(N\tau_p/2)$$

where
$\epsilon$ = dielectric constant of the medium
N = number of pulses
$\tau_p$ = pulse length
C = velocity of light For an oil dielectric ($\epsilon = 3$) and choosing N=20 and $\tau_p = 25$ nsec as shown for the design in Table 1, then the transmission line length is 43 meters.

The thickness of the foil or anode 37 is chosen so that the foil deforms to a cylinder under the differential pressure ΔP across the foil. With ΔP=4.3 atmospheres and the other relevant parameters chosen as shown, vis $$\Delta P \text{ (atm.)} = (\sigma/14.7)(\Delta h/W)\sqrt{24E}$$

$\sigma$ = foil yield stress = 10 psi,
h = foil thickness (cm.),
W = foil width between consecutive supports = 2 cm.
E = foil elongation (strain) ≈ 0.04,
one infers that h = 0.0013 cm.

If the electron gun is operated as a load matched to the impedance of the transmission line, the gun must stand off twice the design voltage or 3 MeV in essentially steady state conditions. Sufficient separation between anode and cathode surfaces must be provided to prevent undesired conduction and arc formation. If the maximum permissible field strength is 100 kilovolts/cm, the minimum anode-cathode separation is d=30 cm, which must also be maintained by cathode and the machine walls; this will reduce the available cathode area and correspondingly increase the cathode current density $J_c$ according to $$J_c = J(l_c/l_c - 2d)(W_c/W_c - 2d) = 25/7J = 5.4 \text{ amps/cm}^2$$

$l_c$ = cathode length (=100 cm here)
$W_c$ = cathode width (=200 cm here)

The breakdown field strength also places an upper limit on current density due to space charge effects, but this number (≳10 amps/cm²) is higher than the densities contemplated for this application.

Beam pinch, wherein the beam electrons are deflected in the gun by their own collective self-magnetic field, places an upper limit on module size. Electron deflection angle at the anode plane is given by $$\theta = \sin^{-1}\left(\frac{d}{r_L}\right),$$

$$r_L = \text{Larmor radium} = \frac{\gamma m v}{e|B|},$$

$$\gamma = \left[1 - (\frac{v}{c})^2\right]^{-\frac{1}{2}}.$$

For a rectangular current distribution, with l=100 cm, h=200 cm, and J=1.5 amps/cm², the maximum magnetic field strength occurs at the beam end and is given by $$|B| = \frac{10^4 J \mu_0 l}{\pi} \left\{ \frac{1}{4} \ln\left[1 + \left(\frac{2h}{l}\right)^2\right] + \frac{h}{l} \tan^{-1}\left(\frac{l}{2h}\right) \right\} = .0072 \text{ Weber}/M^2,$$

$\Theta_{max} = 13°$.

This is not a large angle, but it will cause some shadowing and hence loss of energy to the foil support.

Beam pulse risetimes which are a fraction of the 30 nsec pulse length require ultra low inductance gun design. At the same time, the insulator 35 (FIG. 1) must stand off twice the desired output voltage or 3 MeV. At a conservative field strength such as 20 kV/cm, the insulator would have to be 150 cm long. Inductance can best be minimized over this length by varying either the thickness of the insulator or the insulator-transmission line dielectric (suggested schematically in FIG. 3) so as to maintain a constant impedance in this region.

A tetrode design (four electrode) reduces grid current collection and decouples the control grid from changes in anode voltage. This design also permits minimization of foil support losses, by location of the support beams in the shadows of the grid wires.

Figure 9:
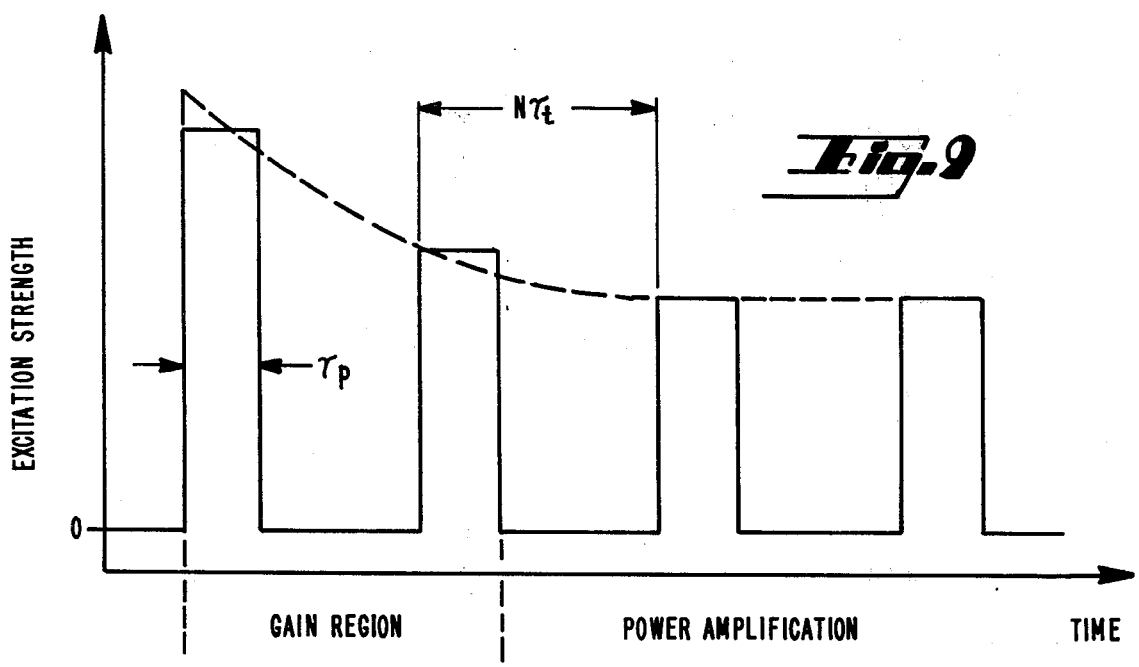
FIG. 9 is a graphic view of amplifier excitation as a function of time, indicating the intial gain region and power amplification region.

For a design with a grid collection of 3%, the grid current per 1×2 meter module would be 900 amps. The grid capacitance is about 2 nfarads. For the cathode current density of 5.4 A/cm² the screen voltage is about 50 kV. The current can be switched by an 18 keV control grid swing, wherein the grid voltage $V_g = -18$ keV (off) and $V_g = -10$ V (on) (FIG. 9); the charging current for a 10 nsec risetime is 3.6 kA. Grid inductance must be less than 30 nH, which should be possible with a distributed or multiple feed-through in the cathode wall (FIG. 5). The energy required to drive the grids is only ~20 Joules, but must be supplied by low inductance, close coupled storage.

Filament and grid supplies must be isolated. Floating them at the line potential during charging is straightforward, but isolation from the high voltage pulses on the line during the burst is more difficult. At low repetition rates, mechanical isolation is reasonable; however, at high rates other means such as inductive isolation may be required. Filament dissipation should be 10–15 W/cm². Since the electron beam delivers about 2.5 Joules/cm² per burst, this energy loss is negligible only for rates $v_r >> 6$ Hz.

One example of a laser system using the subject invention is discussed in copending U.S. patent application Ser. No. 868,639 by E. V. George, et al for a Multiple Excitation Regenerative Amplifier Inertial Confinement System filed on the same day as this application, assigned to the assignee of this application and incorporated by reference herein.

The claimed invention provides a higher pulse repetition rate ($10^4$–$10^6$ Hz) than obtained by the prior art, with pulse lengths (25–100 nanoseconds) of controllable duration and at substantial current densities (as high as 10 amps/cm² is permitted) and high energies. These features all appear to distinguish the subject invention over the prior art.

Although the preferred embodiment of the invention has been shown and described herein, it should be clear that modification and variation may be made without departing from what is regarded as the subject matter of the invention.

What I claim is:

1. Apparatus for producing repetitive pulses of electrons in an excitable medium, the apparatus comprising:
   a source of electrons;
   a cathode connected to the source of electrons;
   an anode, spaced apart from the cathode, for accelerating the electrons from the cathode in response to an electric potential difference between cathode and anode;
   a transmission line of predetermined length, operatively associated with the cathode, for storage of current pulses of at least 0.25 MeV;
   insulator means, connected to one end of the transmission line and to the anode, for maintaining an electric potential difference between the cathode and the anode for periods of time greater than ten microseconds and for permitting the gun to operate at high vacuum; and
   pulse producing means, operatively associated with the anode, for producing a sequence of at least two electric potential pulses with pulse repetition rates of $10^4$–$10^6$ Hz at the anode so as to cause a sequence of at least two pulses of electrons to move from cathode to anode.

2. Apparatus according to claim 1, wherein said source of electrons is a thermionic source.

3. Apparatus according to claim 1, wherein said anode is a foil of material thickness of at least 0.001 cm, supported by a foil support.

4. Apparatus according to claim 1, further including grid means, operatively associated with said anode and said cathode and located therebetween, for controlling electron beam current.

5. Apparatus according to claim 1, wherein said pulse producing means is positioned at one end of said transmission line.

6. Apparatus according to claim 5, wherein the impedance of said pulse producing means is substantially equal to the impedance of said end of said transmission line.

7. Apparatus according to claim 5, wherein the impedance of said pulse producing means is much greater than the impedance of said transmission line.

8. Apparatus according to claim 1, wherein said pulse producing means produces pulses having a length of at least 25 nanoseconds but not exceeding 500 nanoseconds.

9. Apparatus according to claim 1, wherein said pulse producing means produces repetitive pulses having a repetition frequency of at least one per microsecond.

10. A method for producing repetitive electron pulses at repetition rates substantially in the range of $10^4$–$10^6$ per second, the method comprising the steps of spacing a cathode and anode apart so as to accelerate electron therebetween;
    connecting to the cathode a transmission line of predetermined length;
    insulating the transmission line from the anode to permit maintenance of electric potential therebetween of at least 0.25 MeV for short time intervals;
    storing electric potential energy in the transmission line, sufficient to accelerate electrons between cathode and anode to energies of at least 0.25 MeV;
    producing a sequence of at least two electric potential pulses at the anode, any two consecutive pulses being spaced apart by at least one microsecond, so as to cause corresponding pulses of electrons to move from cathode to anode.

11. A method according to claim 10, wherein said electric potential pulses produced at the anode have a duration of at least 25 nanoseconds but not exceeding 500 nanseconds.

* * * * *